US007679072B2

(12) United States Patent
Lim

(10) Patent No.: US 7,679,072 B2
(45) Date of Patent: Mar. 16, 2010

(54) DEVICE FOR TREATING SURFACE OF A POLYMOLECULAR FORMED PRODUCT

(76) Inventor: Deog Gu Lim, 110-1003 Hyundai Apt., 433 Apgujeong-dong, Gangnam-gu, Seoul 135-900 (KR)

( * ) Notice: Subject to any disclaimer, the term of this patent is extended or adjusted under 35 U.S.C. 154(b) by 172 days.

(21) Appl. No.: 11/909,927

(22) PCT Filed: Mar. 20, 2006

(86) PCT No.: PCT/KR2006/001004
§ 371 (c)(1),
(2), (4) Date: Sep. 27, 2007

(87) PCT Pub. No.: WO2006/104323
PCT Pub. Date: Oct. 5, 2006

(65) Prior Publication Data
US 2008/0190559 A1  Aug. 14, 2008

(30) Foreign Application Priority Data
Mar. 31, 2005  (KR) .................. 10-2005-0027107

(51) Int. Cl.
*B29C 59/16* (2006.01)
(52) U.S. Cl. .................................. 250/492.3
(58) Field of Classification Search ............... 250/492.3
See application file for complete search history.

(56) References Cited
U.S. PATENT DOCUMENTS
6,066,286 A    5/2000   Myers
6,136,256 A   10/2000   Bingham et al.
6,514,449 B1   2/2003   Paulauskas et al.
2001/0038079 A1* 11/2001 Ha et al. ............... 250/492.3

FOREIGN PATENT DOCUMENTS
DE        3733492 A1    4/1989

OTHER PUBLICATIONS
EPO Communication dated Aug. 25, 2008 including Supplemental European Search Report for patent application No. EP 06716454.
* cited by examiner

*Primary Examiner*—Kiet T Nguyen
(74) *Attorney, Agent, or Firm*—Porter, Wright, Morris & Arthur, LLP

(57) ABSTRACT

The present invention provides a surface treatment apparatus for molded polymer products. In the operation, a molded polymer product is held by a jig (11) on a product loading and discharging unit (20) and is fed by a product feeding unit (10). A first impurity removing unit (30) cleans the surface of the product. The product passes through an inlet vacuum unit (40) and reaches a product surface ion treatment unit. The ion treatment unit controls an ion beam electric current and produces plasma cations using gas supplied from an atmospheric gas supply unit (60), and the plasma ions are evenly scanned onto the product surfaces. The surface-treated molded product passes through a second impurity removing unit and is fed to the product loading and discharging unit, at which the jig exchanges the existing product for a new product.

7 Claims, 2 Drawing Sheets

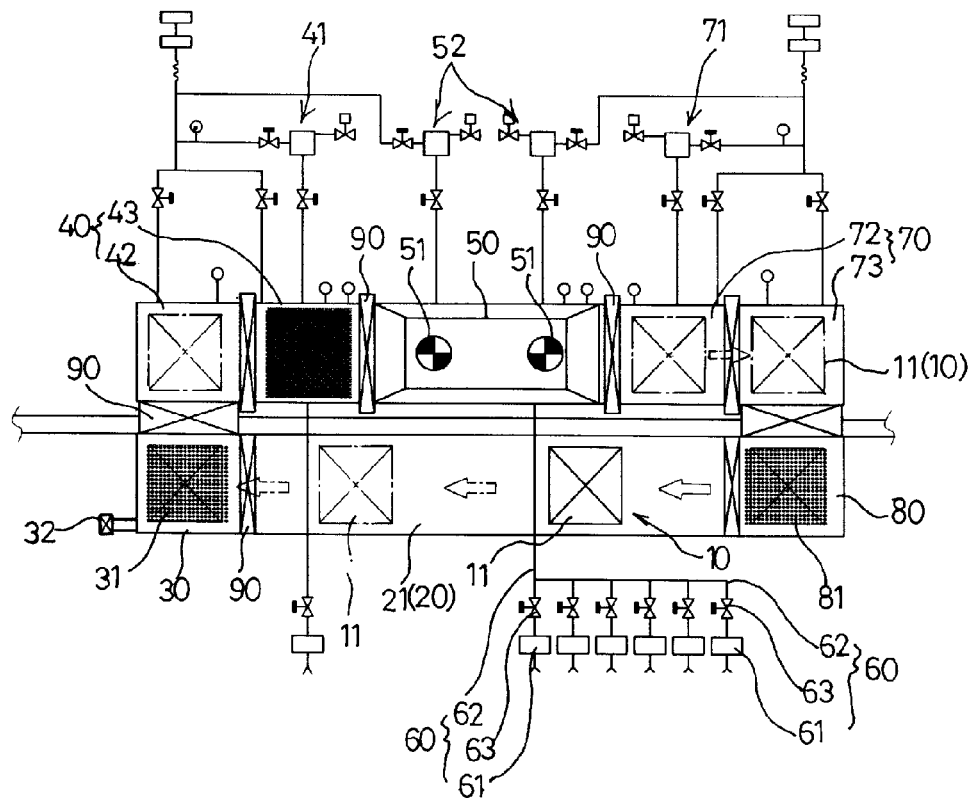
[Fig. 1]
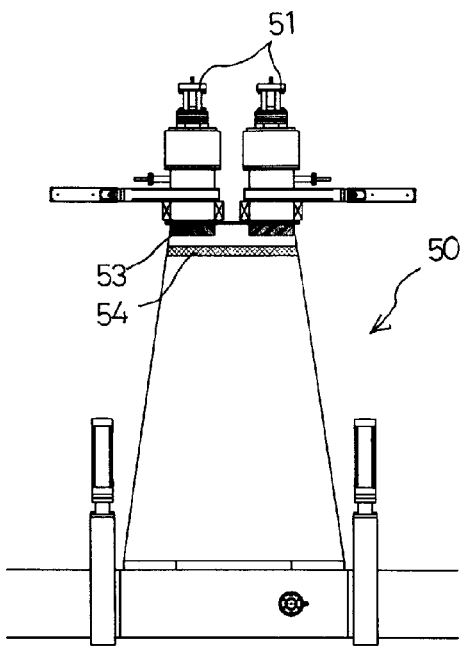
[Fig. 2]

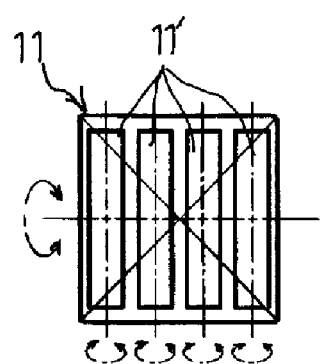
[Fig. 3]

DEVICE FOR TREATING SURFACE OF A POLYMOLECULAR FORMED PRODUCT

TECHNICAL FIELD

The present invention relates to an apparatus for treating the surfaces of molded polymer products and, more particularly, to a surface treatment apparatus for molded polymer products, which treats the surfaces of the molded polymer products by scanning plasma ion beams onto the products' surfaces.

BACKGROUND ART

Generally, portable electronic appliances, such as mobile phones, personal digital assistants (PDAs), notebook computers, liquid crystal display televisions (LCD TVs), portable wireless transceivers, CD players, and MP3 players, are freely and conveniently used by users without being limited with respect to location, so that the portable electronic appliances have been widely and preferably used in recent years.

However, the portable electronic appliances discharge a great quantity of harmful electromagnetic waves due to the variety of electromagnetic circuit units installed therein, and most harmful electromagnetic waves discharged from the appliances are absorbed by the bodies of the users while the users carry the appliances, thus being injurious to health.

The casings of the conventional portable electronic appliances are preferably produced using materials prepared by adding conductive coating materials, additives or fillers to polymer materials.

To prevent harmful electromagnetic waves of internal electromagnetic circuit units of portable terminals from leaking outside the casings of the terminals, the conventional casings for the portable terminals made using the polymer materials are coated with conductive coating materials on the inner and outer surfaces thereof, thus having electric conductivity higher than a predetermined level.

In a conventional conductive coating process, to provide conductivity to polymer materials, a variety of additives or fillers may be added to the polymer materials of the casings of the portable electronic appliances. Examples of the fillers are powdered carbon, carbon fibers, and metallic materials, such as powdered silver.

Conventional fillers, such as powdered carbon or carbon fibers, which are added to the polymer materials in the related art have insufficient volume and a resistance lower than 10Ω/□. The metallic material, such as powdered silver, forms a layer on the surface of the casing, thus degrading the quality of the casing. Furthermore, the metallic material must be added to the polymer material of the casing in an amount up to 60%, so that the metallic material cannot be preferably used, due to the weight, quality, physical and chemical performance, and cost.

Furthermore, the casings for the portable terminals, produced using the above-mentioned metallic materials for shielding electromagnetic waves, are not easily recycled. To recycle the conventional casings, expensive sorters must be used, thus increasing the cost of recycling the casings.

Particularly, the casings of the electronic appliances, which are produced using polymer materials having the conductive coating materials, such as powdered silver or powdered carbon, have reduced durability due to physical and chemical factors, so that the surfaces of the casings may be discolored, easily scratched, or easily worn, thus reducing the expected life spans of the electronic appliances.

Further, the conventional display units of the electronic appliances are made of nonconductive materials, so that it is almost impossible using conventional techniques to prevent the leakage of electromagnetic waves through the display units or to prevent the display units from being charged.

If the coated conductive layer of an electronic product manufactured using a polymer material and a molding process does not have uniform thickness, the coated conductive layer cannot provide a desired coating effect. Thus, to form a coated conductive layer having uniform thickness on an electronic product, a complex and precise high technique and complex and precise expensive equipment must be used. Therefore, the construction of the processing equipment becomes complicated and the processing technique must be precise, so that the production cost of the products is increased due to the cost of developing and designing the processing equipment and the processing techniques.

To accomplish a desired effect of shielding electromagnetic waves and to provide desired conditions for maintaining the stable and reliable operation of the internal circuit units of the electronic appliances, it is necessary to maintain a predetermined shielding ratio, for example, a 20% shielding ratio, at uniform distribution. However, it is almost impossible to accomplish such a shielding ratio using conventional techniques due to technical limits.

Furthermore, because the conventional electric appliances made of polymer materials using expensive additives are not easily recycled, the production cost of the appliances is increased. Due to insufficient performance of the appliances with respect to shielding of electromagnetic waves or the prevention of electric charges, liability for malfunctions of the appliances is increased, thus imposing a heavy burden on the manufacturers. Furthermore, the insufficient performance of the appliances in the shielding of electromagnetic waves or the prevention of electric charges prevents the appliances from being easily recycled.

DISCLOSURE OF INVENTION

Technical Problem

Accordingly, the present invention has been made keeping in mind the above problems occurring in the prior art, and an object of the present invention is to provide a surface treatment apparatus for molded polymer products, which treats the surfaces of electronic products, manufactured using polymer materials and a molding process, using a plasma ion beam scanning technique, thus efficiently preventing the leakage of electromagnetic waves from the molded polymer products and allowing manufacturers to produce the polymer products in large quantities, thereby reducing the production cost of the products, increasing the effect of shielding electromagnetic waves and improving the operational reliability of the internal electronic circuit units of the appliances.

Another object of the present invention is to provide a surface treatment apparatus for molded polymer products, which remarkably increases the hardness of the outer surface of the molded polymer products and accomplishes fineness of the products through surface reforming, thus increasing the durability of the products.

A further object of the present invention is to provide a surface treatment apparatus for molded polymer products, which can be adapted to a variety of display devices, such as CRTs, thus efficiently shielding electromagnetic waves emitted from the display devices and accomplishing uniform distribution of electric conductive resistance over the surface of the display devices, thereby preventing the display devices from being electrically charged and protecting the user's eyes.

Yet another object of the present invention is to provide a surface treatment apparatus for molded polymer products, which can provide desired electric conductivity to the surfaces of the molded polymer products, thus allowing IC Packages or LCDs to be safely moved and allowing the molded polymer products to be efficiently and easily recycled, thereby reducing environmental contamination and preventing the waste of natural resources caused by the products.

Still another object of the present invention is to provide a surface treatment apparatus for molded polymer products, which does not require expensive additives for the coating materials for the casing surfaces of portable electronic products and removes the conventional precision coating process, thus reducing the production cost and reducing the number of bad products.

Still another object of the present invention is to provide a surface treatment apparatus for molded polymer products, which can supply a single atmospheric gas or a gas mixture, prepared by mixing two or more atmospheric gases at a predetermined ratio, into a product surface ion treatment unit according to output power of an ion gun, ion scanning time and base color of a product, thus variously changing the color of the product.

Technical Solution

In order to achieve the above objects, according to an aspect of the present invention, there is provided a surface treatment apparatus for molded polymer products, comprising:

a product feeding unit 10 having a jig 11, the jig 11 changeably holding a molded polymer product and sequentially feeding the molded polymer product through a plurality of processing units of the surface treatment apparatus;

a product loading and discharging unit 20, on which the molded polymer product to be surface-treated is placed to be held by the jig 11 of the product feeding unit 10, and a completely surface-treated molded polymer product is released from the jig 11 to be placed onto the product loading and discharging unit;

a first impurity removing unit 30 placed at a side of the product loading and discharging unit 20 for removing impurities from the surface of the molded polymer product while the molded polymer product held by the jig 11 on the product loading and discharging unit 20 is fed through the product feeding unit 10;

an inlet vacuum unit 40 placed at a side of the first impurity removing unit 30 and having an interior maintained at a predetermined degree of vacuum, the inlet vacuum unit comprising an inlet having openable gates 90 at opposite ends thereof so that the molded polymer product held by the jig 11 of the product feeding unit 10 passes through the interior of the inlet vacuum unit;

a product surface ion treatment unit 50 placed at a side of the inlet vacuum unit 40 and having an interior maintained at a predetermined degree of vacuum, with an ion gun 51 provided in the ion treatment unit to scan ion beams onto a surface of the molded polymer product held and fed by the jig 11 of the product feeding unit 10 in the ion treatment unit;

an atmospheric gas supply unit 60 connected to the product surface ion treatment unit 50 and supplying atmospheric gas to the product surface ion treatment unit 50;

an outlet vacuum unit 70 placed at a side of the product surface ion treatment unit 50 and connected thereto, and having an interior maintained at a predetermined degree of vacuum, the outlet vacuum unit comprising an inlet and an outlet having respective openable gates 90 at opposite ends thereof so that the molded polymer product held by the jig 11 of the product feeding unit 10 passes through the interior of the outlet vacuum unit; and a second impurity removing unit 80 placed between the outlet vacuum unit 70 and the product loading and discharging unit 20 and preventing impurities from sticking on the surface of the molded polymer product fed from the outlet vacuum unit 70, and removing impurities from the surface of the molded polymer product.

In other words, a molded product to be subjected to surface treatment is held by a jig 11 on a product loading and discharging unit 20 and is fed by a product feeding unit 10. In a first impurity removing unit 30, impurities are removed from the product so that the surface of the product is cleaned. Thereafter, the molded product passes through an inlet vacuum unit 40 and reaches a product surface ion treatment unit, thus preventing reduced productivity of products due to rapid variation in the degree of vacuum. In the product surface ion treatment unit, an ion beam electric current is controlled to produce positively charged plasma ions using gas supplied from an atmospheric gas supply unit 60, and the plasma ions are evenly scanned onto the surface of the product.

Thereafter, the surface-treated molded product passes through a second impurity removing unit 80 so that the product free from impurities is fed to a product loading and discharging unit 20, at which the product is released from the jig 11 of the product feeding unit 10. The jig 11, having completely released the surface-treated molded product, holds a new molded product to be subjected to surface treatment and feeds the product to the product feeding unit 10 so as to repeat the above-mentioned process.

Advantageous Effects

As is apparent from the above descriptions, the present invention provides advantages in that the surface treatment apparatus for molded polymer products treats the surface of a molded polymer product using a plasma ion beam scanning technique, thus efficiently shielding electromagnetic waves emitted from the molded electronic products and allowing the molded polymer products to be manufactured in large quantities.

Further, the present invention also provides advantages in that the surface treatment apparatus provides desired electric conductivity to the surfaces of the molded polymer products without using separate additives or fillers, thus reducing the production cost of the molded polymer products, simplifying the process of producing the products and allowing the products to be efficiently and easily recycled, thereby reducing environmental contamination and preventing waste of natural resources caused by the products.

The present invention provides further advantages in that the surface treatment apparatus increases the effect of shielding electromagnetic waves and operational safety and reliability of the internal circuit units of the molded polymer products, remarkably increases the hardness of the outer surface of the molded polymer products, and accomplishes fineness of the products through surface reforming, thus increasing the durability of the products.

Therefore, the present invention remarkably increases the economic efficiency and operational performance of the molded polymer products and allows the products to be efficiently and easily recycled, so that molded polymer products capable of shielding electromagnetic waves can be easily produced in large quantities.

BRIEF DESCRIPTION OF THE DRAWINGS

FIG. 1 is a view schematically showing the construction of a surface treatment apparatus for molded polymer products according to the present invention;

FIG. 2 is an enlarged view showing the construction and operation of a product surface ion treatment unit of the surface treatment apparatus for molded polymer products according to the present invention; and FIG. 3 is a view schematically showing a jig of the surface treatment apparatus for molded polymer products according to the present invention.

BEST MODE FOR CARRYING OUT THE INVENTION

Hereafter, a preferred embodiment of the present invention will be described with reference to the accompanying drawings.

FIG. 1 is a view schematically showing the construction of a surface treatment apparatus for molded polymer products according to the present invention. As shown in the drawing, a jig of the surface treatment apparatus according to the present invention is moved along a product feeding unit, holds a molded polymer product on a product loading and discharging unit and, thereafter, sequentially passes through a first impurity removing unit, an inlet vacuum unit, a product surface ion treatment unit, and an outlet vacuum unit to reach the product loading and discharging unit again to release the surface-treated molded polymer product, thus placing the surface-treated molded polymer product onto the product loading and discharging unit.

FIG. 2 is an enlarged view showing the construction and operation of a product surface ion treatment unit of the surface treatment apparatus for molded polymer products according to the present invention. As shown in the drawing, the product surface ion treatment unit comprises two or more ion guns to emit ion beams, with a grid placed below each of the ion guns to evenly apply energy to the surface of the molded polymer product.

FIG. 3 is a view schematically showing a jig of the surface treatment apparatus for molded polymer products according to the present invention. As shown in the drawing, the jig provided on a product feeding unit is configured such that the jig comprises a plurality of jig parts, which can be rotated upwards and downwards in four directions in a state in which the jig changes an existing molded polymer product with a new molded polymer product, thus causing the ion beams to be evenly scanned onto the surface of the product.

As shown in FIG. 1, the surface treatment apparatus for molded polymer products according to the present invention comprises a product loading and discharging unit 20, a first impurity removing unit 30, an inlet vacuum unit 40, a product surface ion treatment unit 50, and an outlet vacuum unit 70, which are sequentially arranged to cause a jig holding a molded polymer product to sequentially pass through the units.

The product feeding unit 10 comprises a jig 11 to changeably hold a molded polymer product. The jig 11 passes through the product loading and discharging unit 20, the first impurity removing unit 30, the inlet vacuum unit 40, the product surface ion treatment unit 50, and the outlet vacuum unit 70 to reach the product loading and discharging unit 20 again along a conveyor belt (not shown), which forms a process line.

As shown in FIG. 3, the jig 11 comprises a plurality of jig parts 11' such that the jig parts 11' can changeably hold a plurality of molded polymer products and each of the jig parts 11' can be rotated upwards and downwards in four directions in a state in which the existing product is changed with a new product. Thus, during a process of treating the surface of a molded polymer product, the jig parts 11' can evenly treat the surface of the molded polymer product while each of the jig parts 11' is maintained at a position having predetermined upward or downward angles with respect to the four directions.

Described in detail, the jig 11 of the product feeding unit 10 holds a molded polymer product in the product loading and discharging unit 20 and is moved by a conveyor belt. Thus, the jig 11 sequentially passes through the first impurity removing unit 30, the inlet vacuum unit 40, the product surface ion treatment unit 50 and the outlet vacuum unit 70, so that the ion treatment of the surface of the molded polymer product is accomplished. Thereafter, the jig 11 holding the surface-treated molded polymer product reaches the product loading and discharging unit 20 again and, at the unit 20, the jig 11 releases the surface-treated molded polymer product and places the product on the unit 20 and, thereafter, holds a new molded polymer product. The jig 11 holding the new product sequentially passes through the above-mentioned units and repeats the above-mentioned process to ion-treat the surface of the new product.

The product loading and discharging unit 20 comprises a product waiting plate 21, which has a predetermined length and a flat upper surface. In the front of the upper surface of the product waiting plate 21 in a moving direction of the jig 11 of the product feeding unit 10, a molded polymer product to be newly surface-treated is placed. On the rear part of the upper surface of the product waiting plate 21, a surface-treated molded product is placed.

The molded polymer product placed in the front of the product waiting plate 21 is held by the jig 11 of the product feeding unit 10 and is moved along a conveyor belt line.

At a side of the product loading and discharging unit 20, the first impurity removing unit 30 is connected to the unit 20, so that the first impurity removing unit 30 can remove impurities from the surface of the molded polymer product. Thus, the first impurity removing unit 30 removes impurities from the surface of the molded polymer product held by the jig 11, with two gates 90 provided at the inlet and outlet of the first impurity removing unit 30 to open or close the inlet and outlet.

The first impurity removing unit 30 comprises a first air blower 31, which can preheat the molded polymer product by spraying hot air heated by a heater onto the surface of the product. Because the first impurity removing unit 30 removes impurities from the surface of a molded polymer product, which is held by the jig 11, using hot air heated by the heater and sprayed by the first air blower 31 and, furthermore, the unit 30 preheats and ionizes the surface of the molded polymer product using the hot air, the ion beam scanning time can be reduced.

An anionizer 32 is provided in an air suction inlet of the first air blower 31 and prevents dust, which is generated during the process of removing impurities from the surface of the molded polymer product, from sticking to the internal surface of the first impurity removing unit 30. The apparatus is configured such that dust can be easily discharged outside the apparatus when the inlet gate 90 is closed after the molded polymer product has been fed into the first impurity removing unit 30.

When the inlet gate 90 of the first impurity removing unit 30 is closed, a vacuum pump is operated to maintain the degree of vacuum of the first impurity removing unit 30 at $1.2\times10^{-3}$ torr.

At a side of the first impurity removing unit 30, the inlet vacuum unit 40 is placed to communicate with the outlet gate 90. The interior of the inlet vacuum unit 40 is maintained at a predetermined degree of vacuum, so that the molded polymer product is not affected by rapid variation in the degree of vacuum. The inlet vacuum unit 40 includes a first vacuum control unit 41 having a vacuum pump to maintain the predetermined degree of vacuum.

The inlet vacuum unit 40 further includes a first preliminary vacuum chamber 42, which is maintained at a degree of vacuum of $1.2\times10^{-4}$ torr, and a second preliminary vacuum chamber 43, which is maintained at a degree of vacuum of $1.2\times10^{-5}$ torr.

An openable gate 90 is provided between the first impurity removing unit 30 and the first preliminary vacuum chamber 42, and another openable gate 90 is provided between the first preliminary vacuum chamber 42 and the second preliminary vacuum chamber 43. The openable gates 90 are opened or closed to feed the molded polymer product using the product feeding unit 10.

The first impurity removing unit 30 and the first and second preliminary vacuum chambers 42 and 43 have different degrees of vacuum gradually increasing in the order of the unit 30, the first chamber 42 and the second chamber 43. Thus, the molded polymer product, which sequentially passes through the first impurity removing unit 30 and the first and second preliminary vacuum chambers 42 and 43, is prevented from being affected by rapid variation in the degree of vacuum during a surface ionizing process, so that the productivity of the products is not reduced.

Furthermore, even if the gates 90 are opened to feed the molded polymer product to the product surface ion treatment unit 50, which will be described in detail later herein, the degree of vacuum of the product surface ion treatment unit 50 is not reduced, but is desirably maintained at a predetermined constant degree of vacuum. The present invention can produce products having uniform operational performance while preventing the production of bad products during a process of producing the products in large quantities.

The product surface ion treatment unit 50 is connected to the outlet of the inlet vacuum unit 40. The product surface ion treatment unit 50 includes a second vacuum control unit 52, which has a vacuum pump to maintain the degree of vacuum of the unit 50 at $1.2\times10^{-5}$ torr, which is the same as the degree of vacuum of the second preliminary vacuum chamber 43.

Further, two or more ion guns 51 for emitting ion beams are provided in the product surface ion treatment unit 50. Each of the ion guns 51 is operated using a voltage of 50~100 keV and an electric current of 10~100 mA.

An accelerating tube 53 is placed below each of the ion guns 51 such that the ion beams deeply and quickly penetrate the surface of the molded polymer product through the accelerating tubes 53. A bias voltage is applied to the molded polymer product, thus enhancing the function of the accelerating tube and reducing beam scanning time, thereby allowing the molded polymer products to be produced in large quantities.

A grid 54 is provided below the ion guns 51 to maximize the ion beam width and to evenly apply energy onto the surface of the molded polymer product. The grid 54 has two or more holes, thus varying the shape of the ion beams and limiting the overlapping part of the ion beams to 25 mm or less, thereby maximizing the effective beam width.

Described in detail, the ion beams scanned from the plurality of ion guns 51 overlap each other on the surface of the molded polymer product. The present invention limits the overlapping part of the ion beams to 25 mm or less, thereby setting the effective beam width to 400 mm (length)×900 mm (width).

Further, the ion guns 51 are secured in the product surface ion treatment unit 50 using locking bolts such that the interval between the two ion guns 51 is adjustable. Thus, when it is required to adjust the interval between the two ion guns 51 due to the size of a molded polymer product, which is surface-treated in the product surface ion treatment unit 50, or other factors, the locking bolts are loosened to allow the interval between the ion guns 51 to be adjusted as desired. Therefore, the ion guns 51 can be efficiently used for surface-treating a variety of molded polymer products.

In the present invention, the distance between each of the ion guns 51 and the molded polymer product is preferably set to 1 m ~2 m. In the case of a molded polymer product for which the scanning time must be reduced, although the effective width of the ion beam is reduced, the distance between each of the ion guns 51 and the molded polymer product is adjusted to become shorter.

Described in detail, the distance between each of the ion guns 51 and the molded polymer product is controlled according to the size of the product such that, when the product is a small-sized product, the distance is reduced in order to reduce scanning time, but when the product is a large-sized product, the distance is increased to maximize the ion beam width and allow the large-sized molded polymer products to be produced in large quantities.

The surface color of the molded polymer product can be variously changed according to the output power of the ion guns 51, ion scanning time and base color of the product. Thus, the surface of the molded polymer product is physically reformed to have various colors and accomplish desired hardness and fineness.

The atmospheric gas supply unit 60 is connected to the product surface ion treatment unit 50 so as to supply atmospheric gas into the ion treatment unit 50. In other words, atmospheric gas is fed from the atmospheric gas supply unit 60 to the product surface ion treatment unit 50.

The atmospheric gas supply unit 60 includes a plurality of atmospheric gas tanks 61 to respectively store therein nitrogen gas, argon gas, helium gas, xenon gas and hydrogen gas. A plurality of atmospheric gas supply pipes 62 connects the atmospheric gas tanks 61 for nitrogen gas, argon gas, helium gas, xenon gas and hydrogen gas to the product surface ion treatment unit 50. The atmospheric gas supply unit 60 further includes a plurality of atmospheric gas control valves 63, which are mounted on the respective atmospheric gas supply pipes 62 to control the atmospheric gases supplied to the product surface ion treatment unit 50.

The atmospheric gas supply unit 60 supplies appropriate atmospheric gas suitable for use with the molded polymer product to the product surface ion treatment unit 50. The atmospheric gas supply unit 60 supplies a single atmospheric gas or a gas mixture prepared by mixing two or more atmospheric gases at a predetermined mixing ratio in the product surface ion treatment unit 50 according to output power of the ion guns 51, ion scanning time and base color of the product, thus variously changing the color of the molded polymer product.

In the operation of the apparatus, the inlet gate 90 of the product surface ion treatment unit 50 is opened to place a molded polymer product in the product surface ion treatment unit 50. When the molded product has been placed in the unit 50, the inlet gate 90 of the unit 50 is closed and atmospheric gas required to ion-treat the surface of the product is supplied from the atmospheric gas supply unit 60 into the product surface ion treatment unit 50.

In the above state, the voltage, which is supplied to the ion guns 51 installed in the product surface ion treatment unit 50, controls the ion beam electric current at a predetermined level, thus generating filament heat or electric arc from the ion guns 51 and producing plasma from the filament heat or electric arc. Therefore, positively charged ions, that is, cations, are produced from the atmospheric gas and are evenly emitted onto the surface of the molded polymer product.

In the above case, both the ion scanning time and the ion density are variously set according to the heat resistance of the molded polymer product, desired surface hardness of the product, and electric conductivity of the product. If the output power of the ion beams is reduced and the ion scanning time is lengthened, the color of the surface of the molded polymer product becomes a mixture of the base color and light brown. Meanwhile, if the output power of the ion beams is increased and the ion scanning time is shortened, the base color of the product surface disappears, and is changed to dark brown.

As described above, when ion beams are scanned onto the surface of a molded polymer product, the jig 11 of the product feeding unit 10 is tilted upwards and downwards at a predetermined angle in four directions by a motor, so that the ion beams can be evenly scanned onto the surface of the molded polymer product.

The outlet vacuum unit 70 is connected to the outlet of the product surface ion treatment unit 50. The outlet vacuum unit 70 is maintained at a predetermined degree of vacuum, so that the molded polymer product is not affected by rapid variation in the degree of vacuum. The outlet vacuum unit 70 includes a third vacuum control unit 71, which includes a vacuum pump to maintain the predetermined degree of vacuum of the unit 70.

The outlet vacuum unit 70 further includes a third preliminary vacuum chamber 72, which is maintained at a degree of vacuum of $1.2 \times 10^{-5}$ torr, and a fourth preliminary vacuum chamber 73, which is maintained at a degree of vacuum of $1.2 \times 10^{-4}$ torr.

Furthermore, the second impurity removing unit 80 is connected to the outlet of the outlet vacuum unit 70. The second impurity removing unit 80 prevents impurities from sticking to the surface of the surface-treated molded product and removes impurities from the surface of the surface-treated molded product.

The second impurity removing unit 80 is maintained at a degree of vacuum of $1.2 \times 10^{-3}$ torr and includes a second air blower 81 to spray pure air onto the surface of the molded polymer product. Due to the pure air sprayed from the first air blower 31, the second impurity removing unit 80 can prevent impurities from sticking to the surface of the molded polymer product held by the jig 11 and prevents air laden with impurities from being introduced into the unit 80 through the outlet.

A plurality of openable gates 90 is placed between the third preliminary vacuum chamber 72, the fourth preliminary vacuum chamber 73, and the second impurity removing unit 80, so that the molded polymer product can be moved by the product feeding unit 10 through the gates 90.

The degrees of vacuum of the third and fourth preliminary vacuum chambers 72 and 73 and the degree of vacuum of the second impurity removing unit 80 are set to be gradually reduced in the order of chambers 72 and 73 and the unit 80. Thus, the molded polymer product, which has been surface-treated at the product surface ion treatment unit 50 and sequentially passes through the third and fourth preliminary vacuum chambers 72 and 73 and the second impurity removing unit 80 prior to being discharged outside the surface treatment apparatus, is prevented from being affected by rapid variation in the degree of vacuum. Therefore, the productivity of the molded polymer products is not reduced.

Furthermore, even if the gates 90 are opened to feed the molded polymer product to the product surface ion treatment unit 50, the degree of vacuum in the product surface ion treatment unit 50 is not reduced, but is maintained at a predetermined constant level. Thus, the surface treatment apparatus can produce molded polymer products having uniform performance without producing bad products during a process of producing molded polymer products in large quantities.

The outlet of the second impurity removing unit 80 is connected to an end of the product loading and discharging unit 20, so that the surface-treated molded polymer product discharged from the second impurity removing unit 80 is fed to the product loading and discharging unit 20. On the product loading and discharging unit 20, the surface-treated molded polymer product is released from the jig 11 of the product feeding unit 10 and is placed on the discharging part of the product loading and discharging unit 20.

The surface-treated molded polymer product, released from the jig 11 and placed on the discharging unit, is fed to a secondary processing stage, while the empty jig 11 of the product feeding unit 10 holds a new molded polymer product placed on the loading part provided on the front part of the product loading and discharging unit, and circulates through the above-mentioned process again to execute surface treatment for the new molded polymer product. Thus, the surface treatment apparatus for molded polymer products according to the present invention is efficiently used for ion-treating the surfaces of the molded polymer products in large quantities.

The invention claimed is:

1. A surface treatment apparatus for molded polymer products, comprising:

a product feeding unit (10) having a jig (11), the jig (11) changeably holding a molded polymer product and sequentially feeding the molded polymer product through a plurality of processing units of the surface treatment apparatus;

a product loading and discharging unit (20), on which the molded polymer product to be surface-treated is placed to be held by the jig (11) of the product feeding unit (10), and a completely surface treated molded polymer product is released from the jig (11) to be placed onto the product loading and discharging unit;

a first impurity removing unit (30) placed at a side of the product loading and discharging unit (20) for removing impurities from the molded polymer product while the molded polymer product held by the jig (11) on the product loading and discharging unit (20) is fed through the product feeding unit (10);

an inlet vacuum unit (40) placed at a side of the first impurity removing unit (30) and having an interior maintained at a predetermined degree of vacuum, the inlet vacuum unit comprising an inlet having openable gates (90) at opposite end thereof so that the molded polymer product held by the jig (11) of the product feeding unit (10) passes through the interior of the inlet vacuum unit;

a product surface ion treatment unit (50) placed at a side of the inlet vacuum unit (40) and having an interior maintained at a predetermined degree of vacuum, with an ion gun (51) provided in the ion treatment unit to scan ion beams onto a surface of the molded polymer product held and fed by the jig (11) of the product feeding unit 910) in the ion treatment unit;

a gas supply unit (60) connected to the product surface ion treatment unit (50) and supplying gas to the product surface ion treatment unit (50);

an outlet vacuum unit (70) placed at a side of the product surface ion treatment unit (50) and connected thereto, and having an interior maintained at a predetermined degree of vacuum, the outlet vacuum unit comprising an inlet and an outlet having respective openable gates (90) at opposite ends thereof so that the molded polymer held by the jig (11) of the product feeding unit (10) passes through the interior of the outlet vacuum unit; and a second impurity removing unit (80) placed between the outlet vacuum unit (70) and the product loading and discharging unit (20) and preventing impurities from sticking on the surface of the molded polymer product fed from the outlet vacuum unit (70), and removing impurities from the surface of the molded polymer product.

2. The surface treatment apparatus for molded polymer products according to claim 1, wherein the jig (11) is configured such that the jig (11) changes a plurality of molded polymer products and is rotated upwards and downwards in four directions in a state in which the jig changes an existing molded polymer product with a new molded polymer product, thus causing ion beams to be evenly scanned onto a variety of molded polymer products.

3. The surface treatment apparatus for molded polymer products according to claim 1, wherein the first impurity removing unit (30) is maintained at a degree of vacuum of $1.2 \times 10^{-3}$ torr using a vacuum pump, with both a first air blower (31) to preheat the molded polymer product by spraying hot air heated by a heater onto the product and an anionizer (32) provided in an air suction inlet of the first air blower (31).

4. The surface treatment apparatus for molded polymer products according to claim 1, wherein the ion gun (51) of the product surface ion treatment unit (50) comprises two ion guns removably mounted in the product surface ion treatment unit (50) using locking bolts, with an accelerating tube (53) placed below the ion guns (51) such that the ion beams deeply and quickly penetrate the surface of the molded polymer product through the accelerator tube, and wherein bias voltage is applied to the molded polymer product, thus enhancing function of the accelerator tube and reducing beam scanning time, thereby allowing molded polymer products to be produced in large quantities.

5. The surface treatment apparatus for molded polymer products according to claim 1, wherein a grid (54) is provided below the ion gun (51) to maximize an ion beam width and to evenly apply energy onto the surface of the molded polymer product, the grid (54) having at least two holes, thus varying the shape of the ion beams and limiting an overlapping part of the ion beams to a maximum of 25 mm, thereby maximizing an effective beam width.

6. The surface treatment apparatus for molded polymer products according to claim 1, wherein the gas supply unit (60) comprises: a plurality of gas tanks (61) to respectively store therein nitrogen gas, argon gas, helium gas, xenon gas and hydrogen gas; a plurality of gas supply pipes (62) to connect the gas tanks (61) for nitrogen gas, argon gas, helium gas, xenon gas and hydrogen gas to the product surface ion treatment unit (50); and a plurality of gas control valves (63) mounted on the respective gas supply pipes (62) to control the gases supplied to the product surface ion treatment unit (50), wherein the gas supply unit (60) supplies appropriate gas suitable for use of the molded polymer product to the product surface ion treatment unit (50), and the gas supply unit supplies one of a single gas from the gas tanks and a gas mixture prepared by mixing at least two gases from the gas tanks at a predetermined mixing ratio into the product surface ion treatment unit (50) according to output power of the ion gun (51), ion scanning time and base color of the product, thus variously changing the color of the molded polymer product.

7. The surface treatment apparatus for molded polymer products according to claim 1, wherein the ion gun (51) is spaced apart from the molded polymer product by a distance of 1 m - 2 m and the distance between the ion gun and the product is controlled according to the size of the product such that, when the product is a small-sized product, the distance is reduced so as to reduce scanning time, but when the product is a large-sized product, the distance is increased to maximize the ion beam width and allow large-size molded polymer products to be produced in large quantities.

* * * * *